I. WING.
SULKY PLOW.
No. 66,200. Patented June 25, 1867.
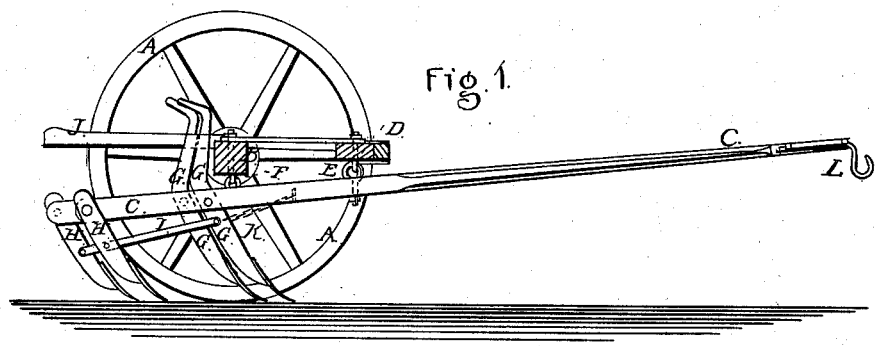
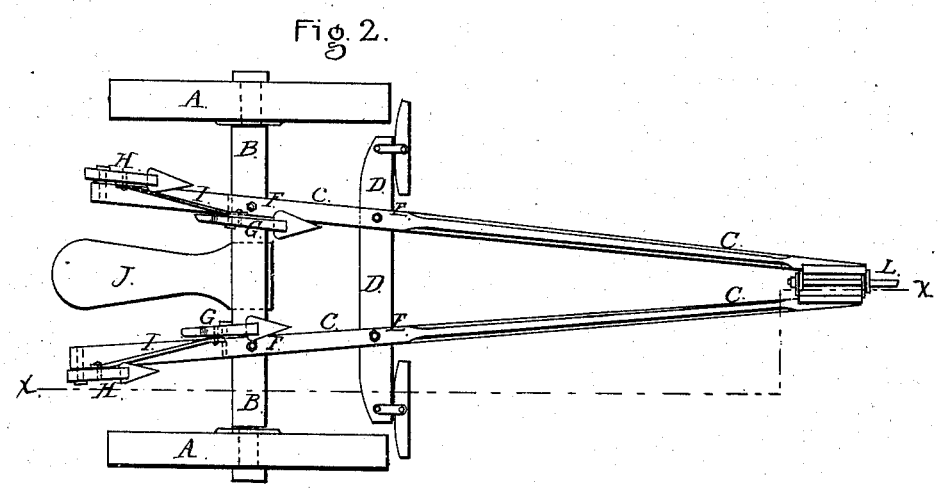
Witnesses:
Theo Tusche
Alex F. Roberts
Inventor:
Israel Wing
Per Munn & Co
Attorneys

United States Patent Office.

ISRAEL WING, OF EARLVILLE, IOWA.

Letters Patent No. 66,200, dated June 25, 1867.

---

SULKY-PLOUGH.

---

The Schedule referred to in these Letters Patent and making part of the same.

---

TO ALL WHOM IT MAY CONCERN:

Be it known that I, ISRAEL WING, of Earlville, in the county of Delaware, and State of Iowa, have invented a new and useful Improvement in Sulky-Plough; and I do hereby declare that the following is a full, clear, and exact description thereof, which will enable others skilled in the art to make and use the same, reference being had to the accompanying drawings, forming part of this specification, in which—

Figure 1 is a detail sectional view of my improved plough, taken through the line $x\ x$, fig. 2.

Figure 2 is an under side view of the same.

Similar letters of reference indicate like parts.

My invention has for its object to furnish an improved sulky-plough, so constructed as to be easily operated, and the ploughs of which can be easily brought nearer together or spread farther apart, as may be required, and it consists in the manner in which the inclined tongues are connected to each other and to the double-tree and axle, and in the manner in which the plough standards are connected to each other and to the inclined tongue; the whole being constructed and arranged as hereinafter more fully described.

A are the wheels, and B is the axle of the plough; C are the tongues, the forward ends of which have eyes attached to their inner sides, through which is passed the shank of the draught-hook L, so that the said tongues may partially revolve upon the said hook. D is the double-tree to which each of the tongues is connected or hinged by a pair of eye-bolts, E. The tongues are also connected or hinged to the axle B by eye-bolts F, so that the tongues may be partially rotated to bring the ploughs closer together or spread them farther apart, as may be required. Several holes may be made in the double-tree D and in the axle B for the eye-bolts, so that the ploughs may be set to run farther apart or closer together, as may be required. G are the front standards, which are pivoted to the inner sides of the tongues C, just in the rear of the axle B, and the upper ends of which are extended upward to form handles. H are the standards of the rear ploughs, which are pivoted to the outer sides of the tongues C. The standards G and H upon each side are connected to each other by the bars, I to the ends of which they are pivoted, so that the rear ploughs may move with the movement of the forward ones. K are chains, the rear ends of which are attached to the forward standards G, and their forward ends to the tongues C, so that the depth to which the ploughs will run may be regulated by lengthening or shortening the said chains. J is the driver's seat, which is securely attached to the middle part of the axle B, so that the driver may guide the ploughs by placing his feet upon the bars I. The ploughs may also be guided by taking hold of the handles formed upon the upper ends of the standards G.

What I claim as new, and desire to secure by Letters Patent, is—

1. The combination of the inclined tongues C with each other, with the double-tree D and axle B, substantially in the manner herein shown and described and for the purpose set forth.

2. The combination of the plough standards G and H, bars I and chains K with each other, and with the tongues C, substantially in the manner herein shown and described and for the purposes set forth.

The above specification of my invention signed by me this 18th day of April, 1867.

ISRAEL WING.

Witnesses:
JAMES LE GASSICK,
R. L. LAWES.